(12) United States Patent
Miro et al.

(10) Patent No.: US 9,243,614 B2
(45) Date of Patent: Jan. 26, 2016

(54) WIND POWERED APPARATUS HAVING COUNTER ROTATING BLADES

(71) Applicants: Carlos Miro, San Juan, PR (US);
 Miguel Hernandez, Peñuelas, PR (US)

(72) Inventors: Carlos Miro, San Juan, PR (US);
 Miguel Hernandez, Peñuelas, PR (US)

(*) Notice: Subject to any disclaimer, the term of this patent is extended or adjusted under 35 U.S.C. 154(b) by 24 days.

(21) Appl. No.: 13/910,501

(22) Filed: Jun. 5, 2013

(65) Prior Publication Data
US 2014/0361543 A1  Dec. 11, 2014

(51) Int. Cl.
| F03D 9/00 | (2006.01) |
| H02P 9/04 | (2006.01) |
| F03D 1/02 | (2006.01) |
| F03D 1/06 | (2006.01) |
| F03D 7/02 | (2006.01) |

(52) U.S. Cl.
CPC ........... *F03D 9/002* (2013.01); *F03D 1/025* (2013.01); *F03D 1/0625* (2013.01); *F03D 1/0633* (2013.01); *F03D 7/0204* (2013.01); *Y02E 10/726* (2013.01)

(58) Field of Classification Search
USPC .................................... 290/44, 55
See application file for complete search history.

(56) References Cited

U.S. PATENT DOCUMENTS

| 2,153,523 | A | * | 4/1939 | Edmonds et al. | 290/55 |
| 2,177,801 | A | * | 10/1939 | Arnold | 290/55 |
| 6,278,197 | B1 | * | 8/2001 | Appa | 290/55 |
| 6,476,513 | B1 | * | 11/2002 | Gueorguiev | 290/55 |
| 6,879,055 | B2 | * | 4/2005 | Becker et al. | 290/55 |
| 7,384,239 | B2 | * | 6/2008 | Wacinski | 416/128 |
| 8,354,759 | B2 | * | 1/2013 | Marchand | 290/55 |
| 2008/0197639 | A1 | * | 8/2008 | Brander | 290/55 |
| 2012/0068463 | A1 | * | 3/2012 | Langenfeld et al. | 290/44 |
| 2013/0277971 | A1 | * | 10/2013 | Cho et al. | 290/44 |

* cited by examiner

*Primary Examiner* — Julio C. Gonzalez
(74) *Attorney, Agent, or Firm* — Ferraiuoli LLC; Eugenio J. Torres-Oyola; Victor M. Rodriguez Reyes

(57) ABSTRACT

A wind powered apparatus (or wind turbine) comprising a stator blade assembly and a rotor blade assembly wherein said stator blades assembly and said rotor blade assembly have counter rotating blades. Both sets of blades assemblies are connected to a generator and are operable to rotate the stator and rotor thereof in opposite directions relative to one another due to the blade arrangement between assemblies. The blades assemblies comprise a hub connected to an outer ring, wherein said outer ring comprises inward blades. The win turbine, more particularly the blade arrangement co-operates to improve performance of the apparatus by affecting its orientation and the rotational speed of the blades.

6 Claims, 9 Drawing Sheets

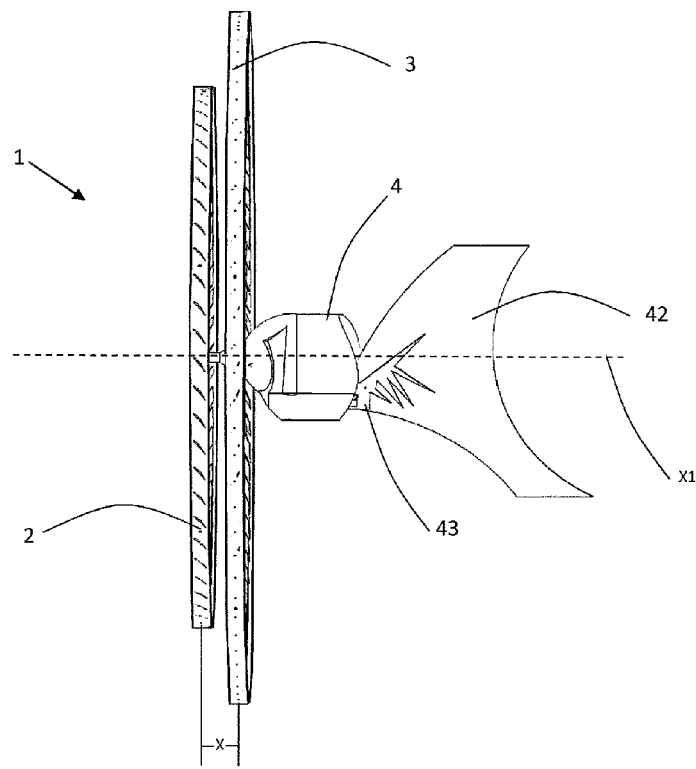
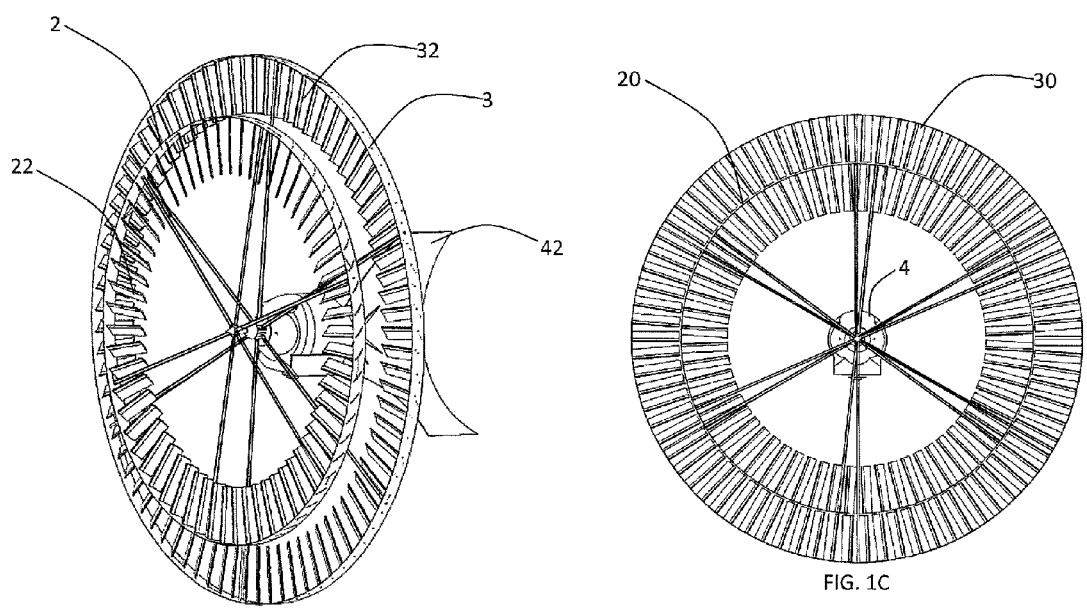
FIG. 1A
FIG. 1B
FIG. 1C

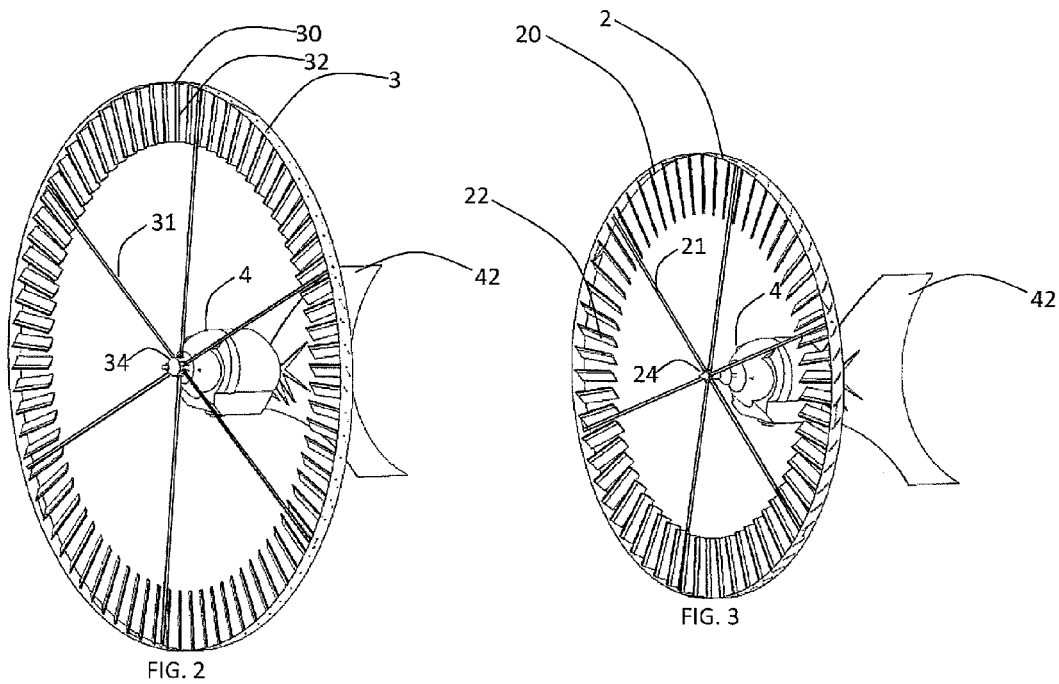
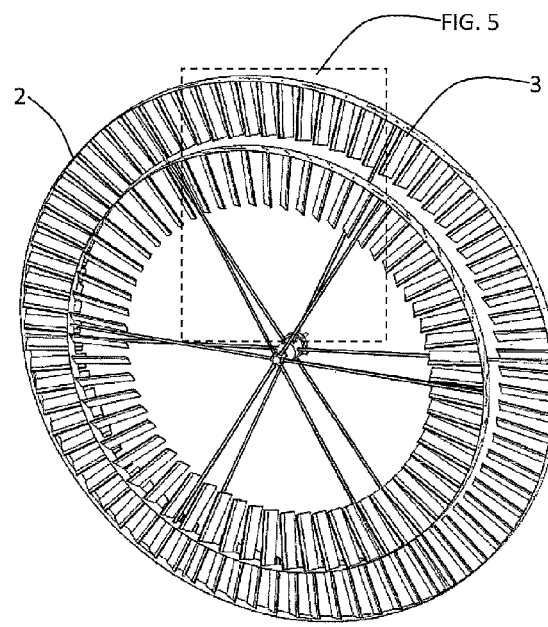

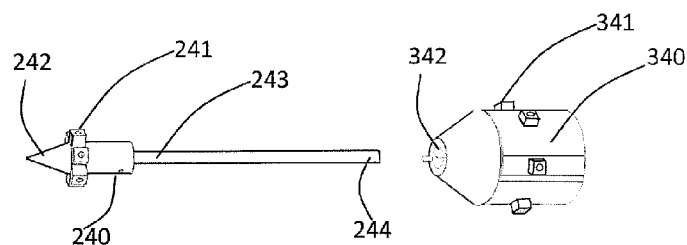
FIG. 7
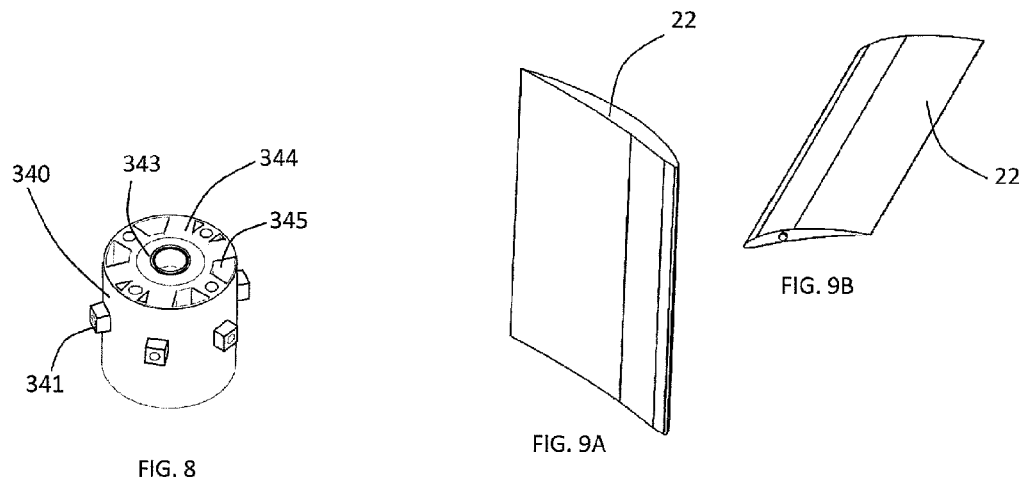
FIG. 8
FIG. 9A
FIG. 9B
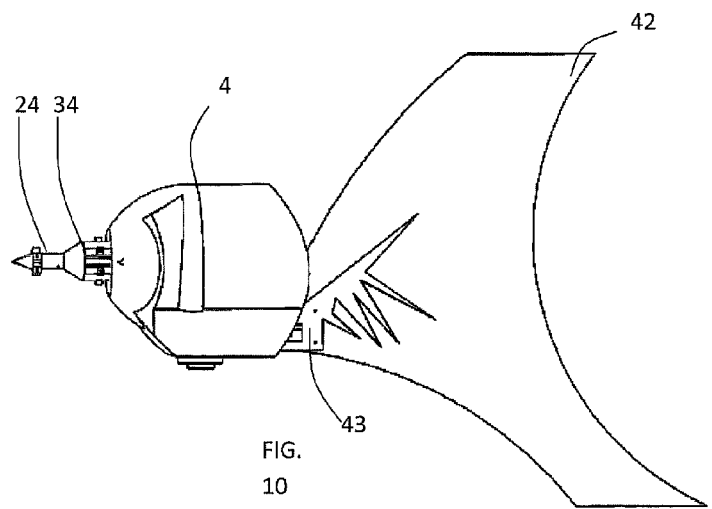
FIG. 10

WIND POWERED APPARATUS HAVING COUNTER ROTATING BLADES

STATEMENT REGARDING FEDERALLY SPONSORED RESEARCH AND DEVELOPMENT

N/A

RELATED APPLICATIONS

N/A

BACKGROUND OF THE DISCLOSURE

1. Field of the Disclosure

The present disclosure relates generally to a wind powered apparatus having two sets of counter rotating blades. More particularly, the invention relates to a wind powered apparatus equipped with an electricity generating means having a stator blade assembly and rotor blade assembly that rotates in opposite directions relative to one another. The wind turbine is further equipped with an inner and outer blade arrangement to improve performance by orienting the apparatus into the wind and/or affecting the rotational speed of the blades.

2. Discussion of the Background

Some well-known wind powered apparatus include a rotor connected to several blades, wherein said rotor is combined with a stator to convert rotational motion, produced by the wind as the primarily force, into electrical energy. However, a problem encountered by wind turbines is the need to prevent unacceptably high rotational speeds during extreme wind conditions. Although one method of accomplishing this is by adding brake systems to the apparatus, this just adds more elements to the wind turbine introducing mechanical complexity. Therefore it is desirable to improve performance by providing a method for operating the apparatus that includes limiting the maximum rotational speed of the blades.

Further, another problem encountered with electricity generating wind power apparatus is the relatively high minimum speed that is required before electricity generation can begin without stalling the apparatus.

Therefore, it would be desirable to improve performance by lowering the minimum wind velocity required for a given electrical output from the apparatus and method for limiting the maximum rotational speed of the blades that overcomes the disadvantages and shortcomings of the prior art.

SUMMARY

In general, the present disclosure overcomes the disadvantages and shortcomings of prior art by disclosing. Accordingly, it is an object of the present disclosure to provide a comprising a stator blade assembly and a rotor blade assembly wherein said stator blades assembly and said rotor blade assembly have counter rotating blades.

The exemplary embodiment in accordance with the principles of the present disclosure comprises a rotor blade assembly and stator blade assembly connected to a generator operable to rotate the stator and rotor thereof in opposite directions relative to one another. This has the effect of increasing the relative speed of movement between the stator and rotor.

It is another object of the present disclosure to provide means for lowering the minimum wind velocity required for rotational movement of the stator blade assembly and rotor blade assembly. In accordance with the principles of the present disclosure the stator blade assembly and the rotor blade assembly, respectively comprises a hub and a outer ring holding inward blades, wherein said hub is connected to the outer ring by means of spokes or rods. The arrangement of inward blades lower the minimum wind velocity required for rotational movement.

Still another object of the present disclosure is to provide means for limiting the maximum rotational speed of the blades. In accordance with the principles of the present disclosure the arrangement between the stator blade assembly and the rotor blade assembly, more particularly the alignment between parts, blade orientation and diameters limits the maximum rotational speed of the blades.

Another object of this disclosure is to provide a mean for holding the stator and rotor in position while allowing the rotational movement of both parts. The present disclosure provide a support structure for the.

It is another object of this disclosure to provide means.

In accordance with the principles of the present disclosure comprises. Therefore, it is another object of this disclosure to provide means to.

Further in accordance with the principles of the present disclosure the exemplary embodiment The disclosure itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute part of the specification and illustrate the preferred embodiment of the disclosure.

FIGS. 1A through 1C shows general structures in accordance with the principles of the present disclosure.

FIG. 2 shows a general structure connection for the stator blade assembly in accordance with the principles of the present disclosure.

FIG. 3 shows a general structure connection for the rotor blade assembly in accordance with the principles of the present disclosure.

FIG. 4 shows a general structure of the arrangement between the stator blade assembly and rotor blade assembly in accordance with the principles of the present disclosure.

FIG. 7 shows an exemplary assembly for the stator hub and rotor hub in accordance with the principles of the present disclosure.

FIG. 8 shows a more detailed view of the stator hub in accordance with the principles of the present disclosure.

FIG. 9 shows a more detailed view of the blades in accordance with the principles of the present disclosure.

FIG. 10 shows a side view wind turbine body assembly without blades in accordance with the principles of the present disclosure.

DESCRIPTION OF THE PREFERRED EMBODIMENT

Figure 5:
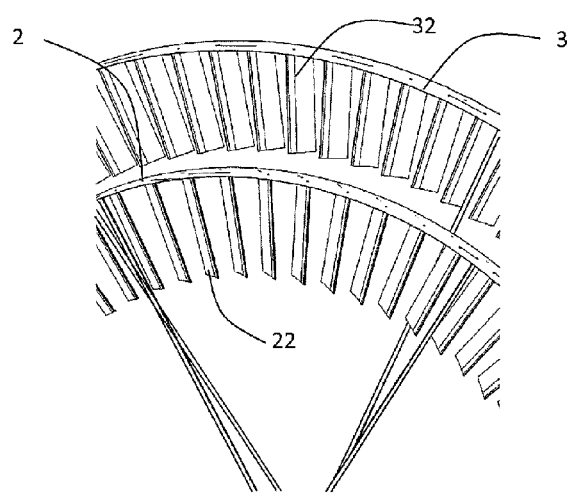
FIG. 5 shows a more detailed view of the arrangement between the stator blade assembly and rotor blade assembling in accordance with the principles of the present disclosure.

The present disclosure is directed to a wind powered turbine 1, as show in FIG. 1, comprising a blade assembly coupled to a generator assembly GA explained below. The wind powered turbine 1 further comprises a stator blade assembly 3, a rotor assembly 2, a nacelle or housing covering the generator assembly GA, a tail holder 43 and a tail 42. The stator blade assembly 3 and rotor assembly 2 rotates about a horizontal axis X1. Further the stator blade assembly 3 and rotor assembly 2 are in front of the other.

The wind powered turbine, in accordance with the principles of the present disclosure, comprises diameter differences between the stator blade assembly 3 and rotor assembly 2, as shown in FIG. 1A through 1C.

The stator blade assembly 3, as shown in FIG. 2, comprises stator ring 30, a plurality of stator spokes 31, stator blades 32 and a stator hub 34. The stator blades 32 are mechanically coupled to the inner surface of the stator ring 30 and each blade is extended inward toward the stator hub 34. Further the stator spokes 31 connect and support the stator ring 30 around stator hub 34 in such way that the stator blade assembly rotates about a horizontal axis X1.

The rotor blade assembly 2, as shown in FIG. 3, comprises rotor ring 20 having a diameter smaller than the stator ring 30, a plurality of rotor spokes 21, rotor blades 22 and a rotor hub 24. The rotor blades 22 are mechanically coupled to the inner surface of the rotor ring 20 and each blade is extended inward toward the rotor hub 24. The mechanically connection between the rotor ring 20 and rotor blades 22 is completed by means of adhesive, integrally formed, screws or any other mean to hold the blades in position while the blades 22 are exposed to the environmental conditions including gust of wind. Further the rotor spokes 21 connect and support the rotor ring 20 around the rotor hub 24 in such way that the rotor blade assembly 2 rotates about a horizontal axis X1.

The rotor blade assembly 2 comprising a smaller diameter than the stator blade assembly 3 is aligned in front the stator blade assembly 3 about a horizontal axis X1, as shown in FIG. 4. The rotor blade 22 and stator blades 32 comprises a blade pitch angle between 13 degrees to 75 degrees. In the exemplary embodiment the blade's orientation on the rotor blade assembly 2 is different from the stator blade assembly 3, as show in FIG. 5. The rotor blade 22 arrangement assists the rotor blade assembly to rotate clockwise, while the stator blade 32 arrangement assists the stator blade assembly 3 to rotate counterclockwise.

Figure 6:
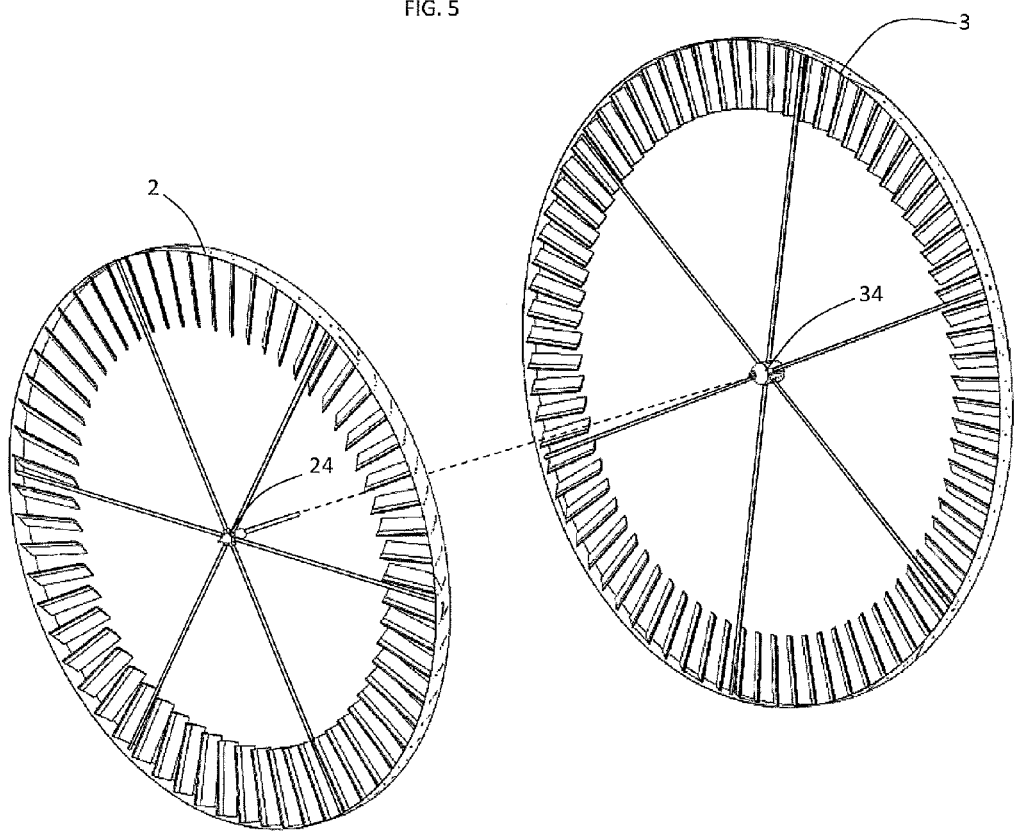
FIG. 6 shows an exemplary assembly for the stator blade assembling and rotor blade assembly in accordance with the principles of the present disclosure.

FIG. 6 is more directed to exemplary assembly of the stator blade assembly 3 and rotor blade assembly 2 in accordance with the principles of the present disclosure. The rotor blade assembly 2 having a smaller diameter is positioned in front of the stator blade assembly 3 and is aligned in position by means of the connection between the rotor hub 24 and stator hub 34.

The rotor hub 24 comprises proximal end 242, distal end 244 and a rotor hub main body 240 surrounded by rotor spoke receptors 241 receiving rotor spokes 21 which are mechanically connected to the rotor ring 20. Further the rotor hub 24 includes a rotor axis bar 243. The hollow stator hub 34 comprises a stator conical front end 342 and a hollow stator hub cylindrical main body 340 surrounded by stator spoke receptors 341 receiving stator spokes 31 which are mechanically connected to the stator ring 30, as shown in FIG. 7.

During the assembly of the rotor blade assembly 2 and stator blade assembly 3 the axis bar 243 is inserted through the hollow stator conical front end aligning the rotor hub 24 with the stator hub 34.

The stator hub cylindrical main body 340 comprises a bearing 243 which surrounds the axis bar 243 assisting rotational movement of the rotor blade assembly 2. Bearing 243 also provide assistance for the stator assembly 3 rotation. The stator hub cylindrical main body 340 further comprises reinforce torque main body 344. The reinforce torque main body 344, if decided, may include recesses to reduce the weight of the reinforce torque main body 344. The recesses 345 may include different configuration including triangles as shown in FIG. 8.

FIG. 9 is more directed to the rotor blades 22 and stator blades 32. Blades are designed or manufacture to reduce weight and inertia.

FIG. 10 through FIG. 18 is directed to powered wind turbine more particularly the generator assembling GA. As shown in FIG. 10 the rotor assembly and stator blade assembly, more particularly the rotor hub 24 and stator hub connects with the generator assembly GA, which is covered by a nacelle 4. Further a tail holder 43 and tail 42 is connected to the generator assembly GA.

Figure 11A:
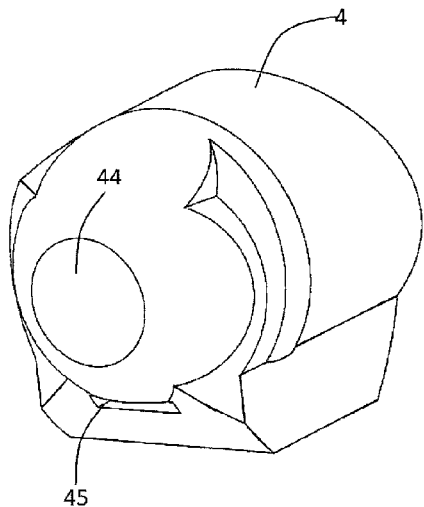
FIG. 11A and FIG. 11B show isometric views of the housing or nacelle in accordance with the principles of the present disclosure.
Figure 11B:
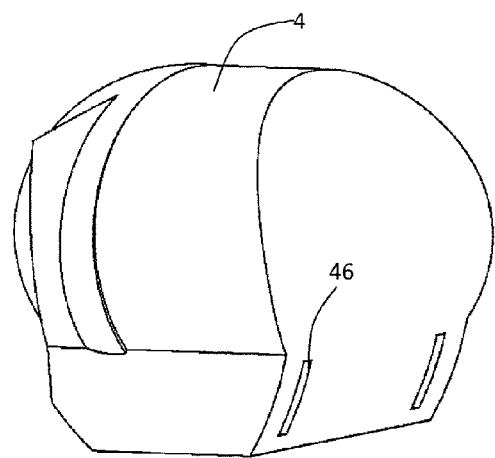

The nacelle 4, as shown in FIG. 11A and FIG. 11B, comprises nacelle access 44, a front recess 45 and at least a back recess 46. The front recess 45 and the back recess 46 serve for ventilation purposes. The nacelle access 44 serves as the access for the connection between the rotor blade assembly 2 and stator blade assembly 3 with the generator assembly GA.

Figure 12:
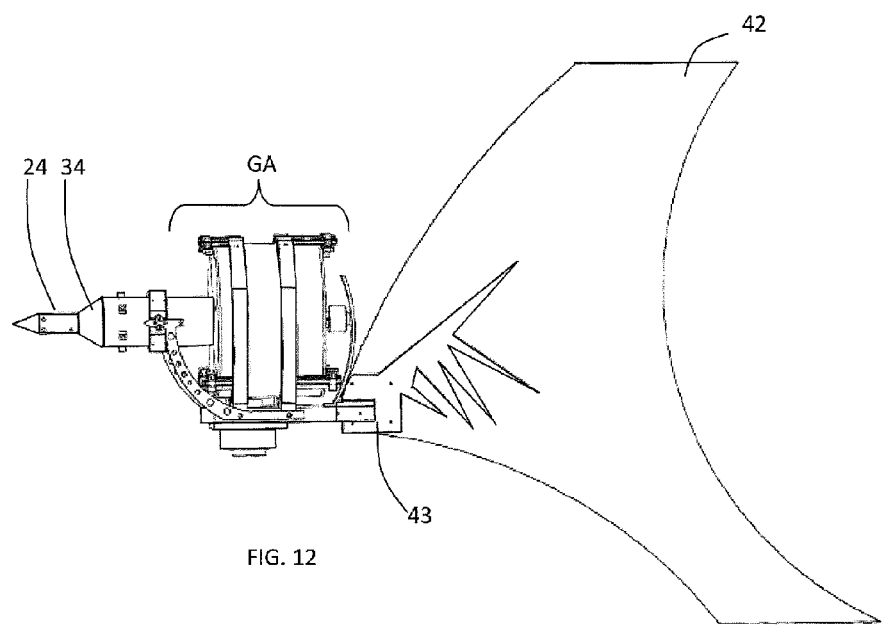
FIG. 12 shows exemplary assembly of the inner wind turbine body assembly without blades in accordance with the principles of the present disclosure.
Figure 13A:
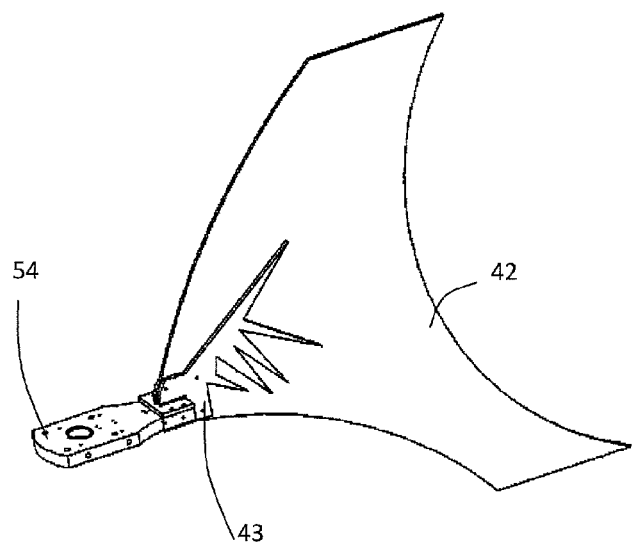
FIG. 13A through FIG. 13C shows several isometric views of the wind turbine tail assembly in accordance with the principles of the present disclosure.
Figure 13B:
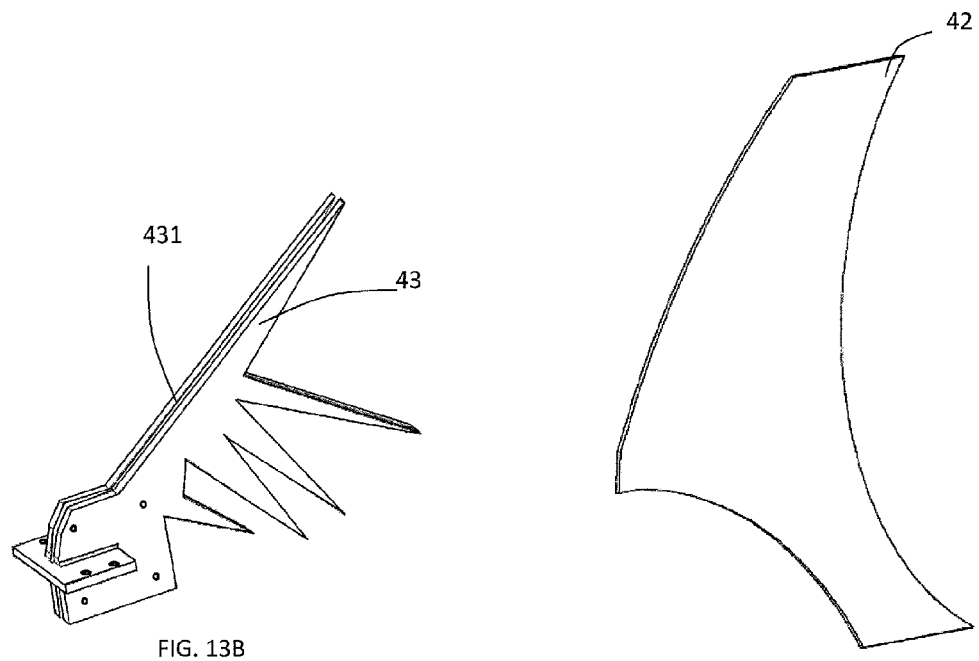
Figure 13C:
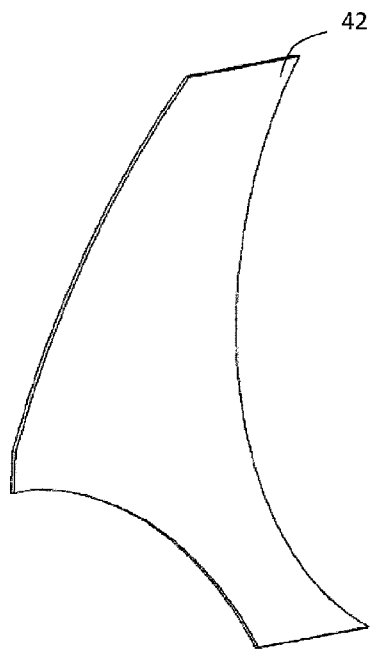
Figure 14:
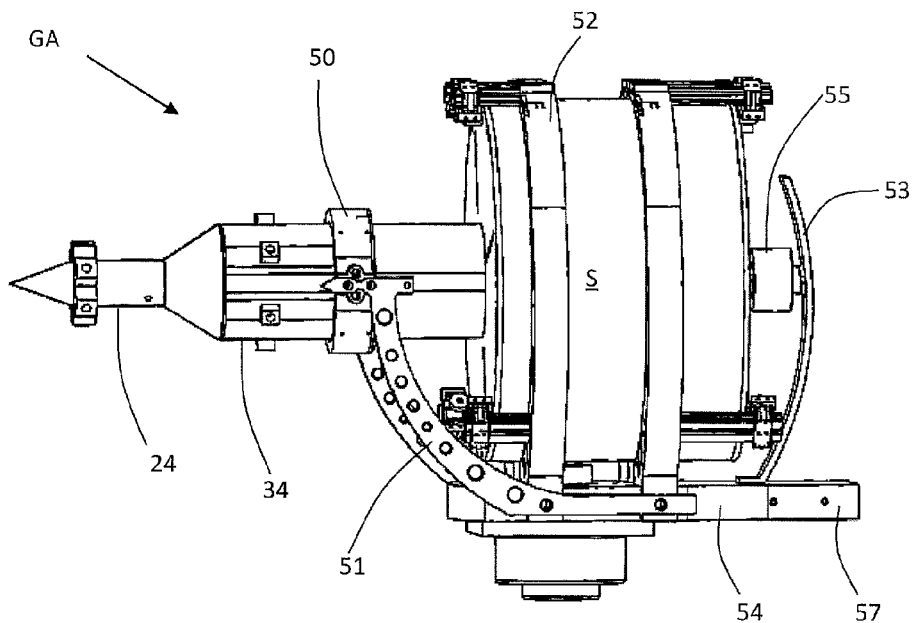
FIG. 14 shows a more detailed view of the exemplary assembly of the inner wind turbine body assembly in accordance with the principles of the present disclosure.
Figure 15:
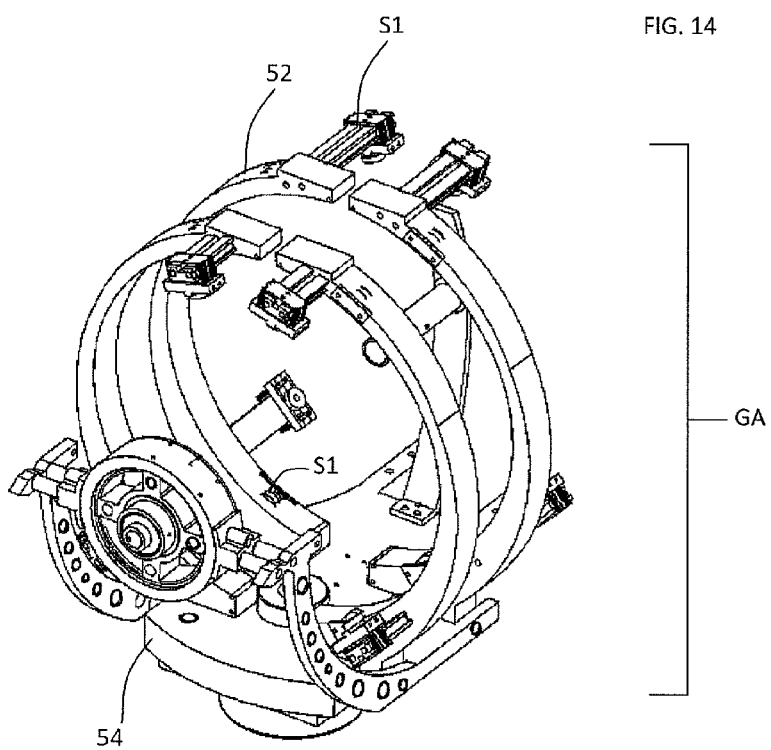
FIG. 15 shows exemplary assembly of the support assembly for the generator assembly in accordance with the principles of the present disclosure.
Figure 16:
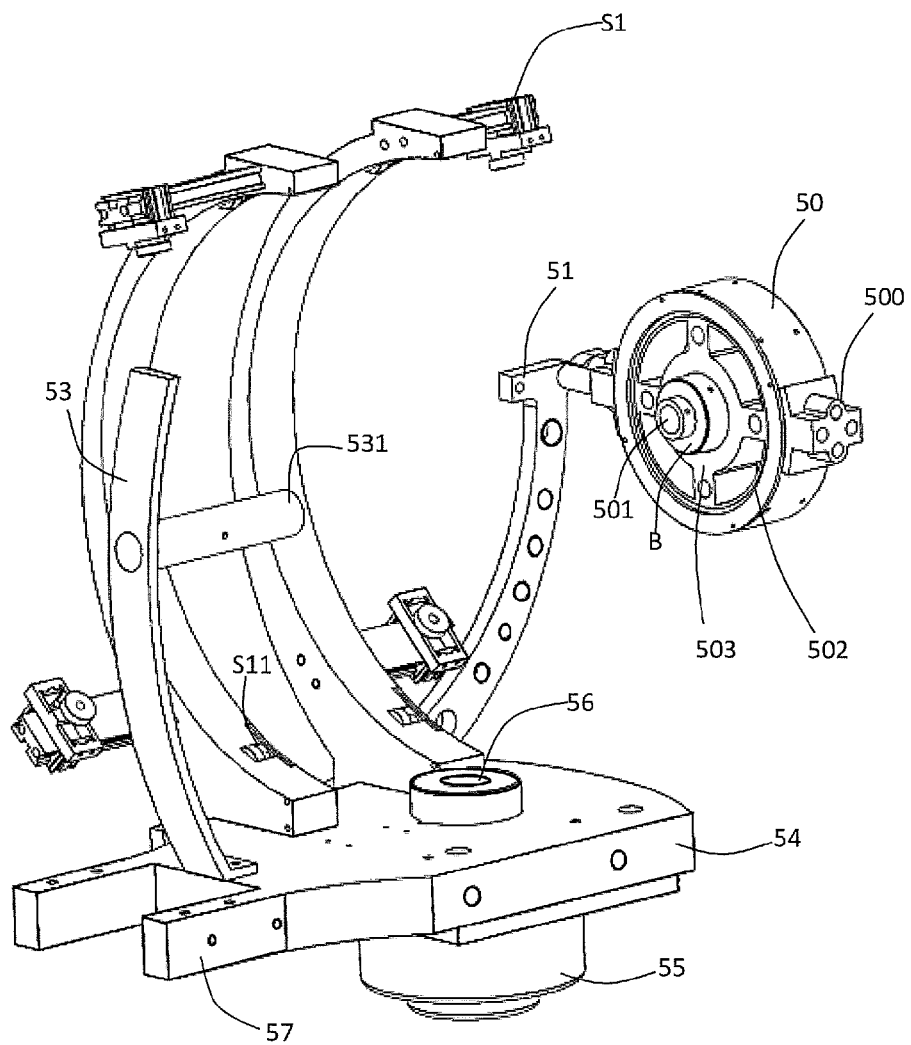
FIG. 16 shows a more detailed view of the support assembly for the generator assembly in accordance with the principles of the present disclosure.

The generator assembly GA, under the nacelle 4 as shown in FIG. 12, is located between the rotor blade assembly 2 and the tail 42. The tail assembly, as shown in FIG. 13A through FIG. 13C, comprises a tail 42 configured to provide an aesthetic and aerodynamic form. Further the tail holder 43 is mechanically connected to the generator base 54 and is configured to evade wind bending gyration to capture wind direction. The tail holder 43 comprises a channel 431 for the insertion of the tail 42. Once the tail 42 is positioned in the channel 431 is securely adjusted.

The generator assembly GA, as shown from FIG. 14 to FIG. 18, comprises a generator base 54, shaft support 53, a shaft receiver 531, a tail holder receiver 57, generator support arm 52, a generator RS, generator bearing 50, bearing arms 51 and slip ring 55.

The generator base 54 is mechanically connected to the generator support arm 52 configured to surround the generator RS. The exemplary embodiment comprises a plurality of generator support arms 52, wherein each support arm 52 comprises generator support bearings S1, wherein said generator bearing S1, S11 assists with the rotation of the stator S and avoid unwanted displacement, more particularly vertical and horizontal displacement.

The generator bearing 50 is supported and connected to the generator base 54 by the bearing arms 51. The generator bearing 50 comprises bearing attaching means 500 and double bearing B including inner bearing 501 and outer bearing 502. The inner bearing 501 assist to transfer the rotational motion provided by the rotor blade assembly 2 to the rotor R. Further the outer bearing 502 assists to transfer the rotational motion provided by the stator blade assembly 3 to the stator S.

The generator base 54 supports the shaft support 53 connected to the shaft receiver 531. Further an intake 56 and outtake 55 serves for providing electrical connection to the generator assembly GA from the outside the nacelle 4.

Figure 17:
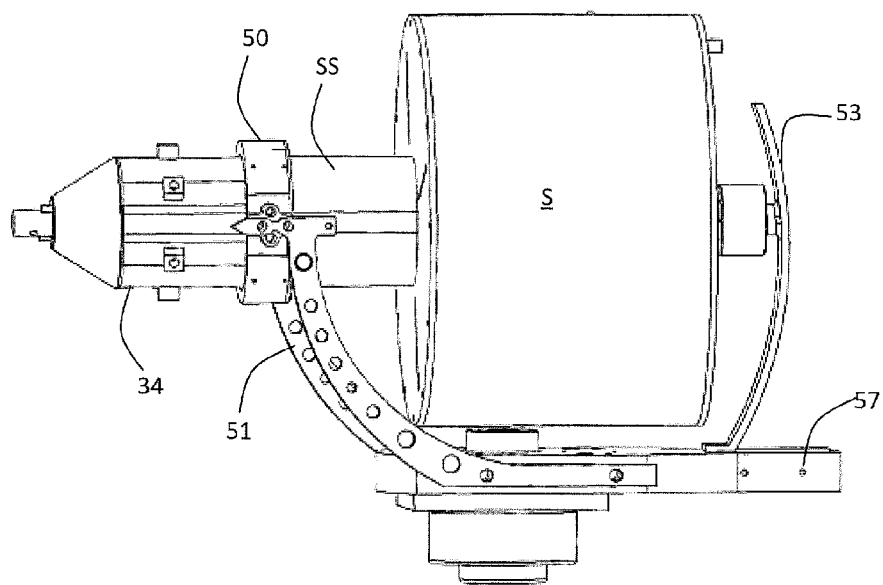
FIG. 17 shows a more detailed view of the support assembly supporting the stator assembly in accordance with the principles of the present disclosure.

FIG. 17 is more directed to the stator S at the generator assembly GA. As mentioned before, the generator support arms 52 surround the stator S assisting with rotation while avoiding the horizontal and vertical displacement. The stator S comprises a stator shaft SS which is coupled to the generator bearing 50, more particular to the outer bearing 502. The stator hub main body 340 is coupled to the generator bearing on one side while the other side is coupled to the stator shaft SS. The rotation of the stator blade assembly 3 is transferred to the stator S by the present coupling between the stator hub 34, outer bearing 502 and stator shaft SS. A slip ring 55 positioned around the receiving shaft 531 serves to capture the electrical energy produced from the interaction between the rotor R and the stator winding (not showed).

Figure 18:
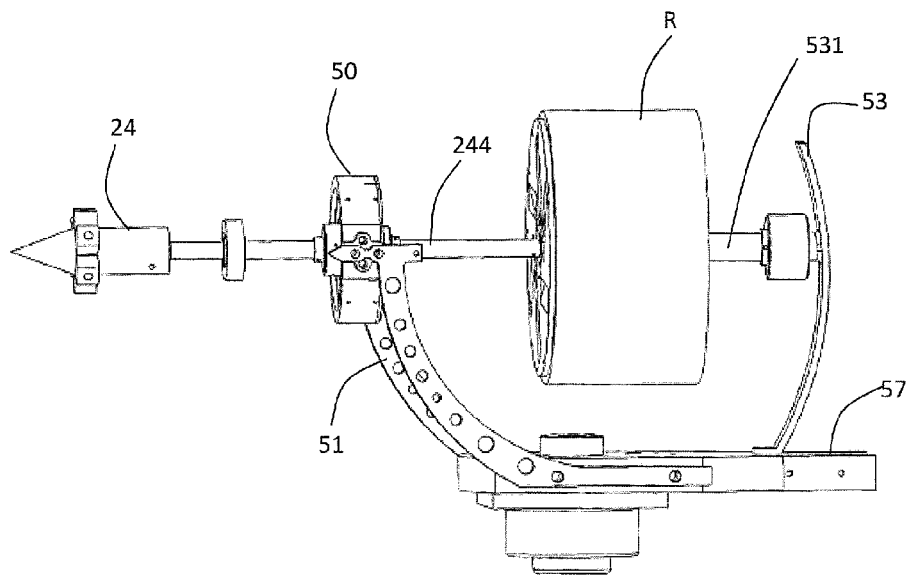
FIG. 18 shows a more detailed view of the support assembly supporting the rotor assembly in accordance with the principles of the present disclosure.

The FIG. 18 is directed to the rotor R, at the generator assembly GA. As mentioned before, the generator bearing 50, more particularly the inner bearing 501 assists with the rotation of the axis bar 243 which is connected to the rotor R at the rotor hub distal end 244. The rotor R, which is surrounded by the stator S, is supported by the receiving shaft 531 at a distal end. In the exemplary embodiment the rotor is a permanent magnet motor however other types of rotor may be used.

The wind powered apparatus (or wind turbine) here disclosed comprises a stator blade assembly and a rotor blade assembly wherein said stator blades assembly and said rotor blade assembly have counter rotating blades. Both sets of blades assemblies are connected to the generator assembly GA and are operable to rotate the stator and rotor thereof in opposite directions relative to one another due to the blade arrangement between assemblies. The win turbine, more particularly the blade arrangement co-operates to improve performance of the apparatus by affecting its orientation and the rotational speed of the blades.

The disclosure is not limited to the precise configuration described above. While the disclosure has been described as having a preferred design, it is understood that many changes, modifications, variations and other uses and applications of the subject disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

The invention claimed is:

1. A wind powered apparatus comprising:
a stator blade assembly,
a rotor blade assembly,
wherein said rotor blade assembly comprises a rotor hub, a rotor outer ring comprising a first diameter, a plurality of rotor inward blades, a rotor shaft and rotor spokes;
wherein said rotor hub is mechanically coupled to the rotor outer ring by means of the rotor spokes and said plurality of rotor inward blades rotates in a first direction about a horizontal axis;
wherein said stator blade assembly comprises a stator hub, stator outer ring comprising a second diameter, a plurality of stator inward blades, a stator shaft and stator spokes wherein said stator hub is mechanically coupled to the outer ring by means of the stator spokes;
wherein said stator blade assembly rotates in a second direction about the horizontal axis;
wherein said rotor blade assembly extends away from said plurality of stator inward blades toward the horizontal axis, wherein said plurality of stator inward blades surrounds the rotor blade assembly; and
a generator comprising a rotor and stator, wherein said rotor blade assembly is mechanically coupled to the rotor by means of the rotor hub, and wherein said stator blade assembly is mechanically coupled to the stator by means of the stator hub.

2. The wind powered apparatus as in claim 1, wherein the second direction is opposite to the first direction.

3. The wind powered apparatus as in claim 1, comprising:
a generator support assembly comprising:
a generator base,
a plurality of generator support arms, wherein each generator support arm surrounds the stator and comprises at least a generator support bearing for allowing rotational displacement of the stator;
a shaft support, wherein said shaft support extend perpendicular from the generator base;
at least a bearing arm;
and a generator bearing, wherein said generator bearing is mechanically coupled to the generator base by means of the bearing arm.

4. The wind powered apparatus as in claim 3, wherein said at least bearing arm comprises two bearing arms.

5. A wind powered apparatus comprising:
a first blade assembly,
a second blade assembly,
wherein said first blade assembly comprises a first hub, a first outer ring comprising a first diameter, a plurality of first inward blades, a first shaft and first spokes;
wherein said first hub is mechanically coupled to the first outer ring by means of the first spokes and said plurality of first inward blades rotates in a first direction about a horizontal axis;
wherein said second blade assembly comprises a second hub, second outer ring comprising a second diameter, a plurality of second inward blades, a second shaft and second spokes wherein said second hub is mechanically coupled to the second outer ring by means of the second spokes;
wherein said second blade assembly rotates in a second direction about the horizontal axis;
wherein said first diameter is smaller than the second diameter; and
wherein said first blade assembly extends away from said plurality of second inward blades toward the horizontal axis.

6. The wind powered apparatus as in claim 5 comprising a generator comprising a rotor and stator, wherein said rotor blade assembly is mechanically coupled to the rotor by means of the first hub, and wherein said second blade assembly is mechanically coupled to the stator by means of the second hub.

* * * * *